(12) United States Patent
Seo

(10) Patent No.: US 9,210,330 B2
(45) Date of Patent: Dec. 8, 2015

(54) IMAGE SENSOR AND ELECTRONIC DEVICE INCLUDING THE SAME

(71) Applicant: Samsung Electronics Co., Ltd., Suwon-Si, Gyeonggi-Do (KR)

(72) Inventor: Jong-Seok Seo, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 42 days.

(21) Appl. No.: 13/943,033

(22) Filed: Jul. 16, 2013

(65) Prior Publication Data

US 2014/0055635 A1 Feb. 27, 2014

(30) Foreign Application Priority Data

Aug. 21, 2012 (KR) ........................ 10-2012-0091084

(51) Int. Cl.
*H04N 5/228* (2006.01)
*H04N 5/235* (2006.01)
*H04N 5/341* (2011.01)
*H04N 5/345* (2011.01)
*H04N 5/353* (2011.01)
*H04N 9/04* (2006.01)

(52) U.S. Cl.
CPC ........... *H04N 5/2351* (2013.01); *H04N 5/2353* (2013.01); *H04N 5/341* (2013.01); *H04N 5/3458* (2013.01); *H04N 5/353* (2013.01); *H04N 9/045* (2013.01)

(58) Field of Classification Search
CPC ... H04N 5/2351; H04N 5/2353; H04N 5/353; H04N 5/341

USPC .......... 348/222.1, 234, 235, 237, 227.1, 360; 396/241

See application file for complete search history.

(56) References Cited

U.S. PATENT DOCUMENTS

| | | | |
|---|---|---|---|
| 8,189,079 B2 | 5/2012 | Tejada et al. | |
| 2005/0224842 A1 | 10/2005 | Toyama | |
| 2009/0310225 A1* | 12/2009 | Matsusaka et al. | 359/676 |
| 2010/0039544 A1 | 2/2010 | Tejada et al. | |
| 2010/0157139 A1* | 6/2010 | Velarde et al. | 348/366 |
| 2010/0201809 A1* | 8/2010 | Oyama et al. | 348/135 |
| 2011/0115940 A1* | 5/2011 | Ojima et al. | 348/222.1 |
| 2013/0187027 A1* | 7/2013 | Qiao et al. | 250/208.1 |

FOREIGN PATENT DOCUMENTS

| | | | |
|---|---|---|---|
| JP | 2003-134303 A | 5/2003 | |
| KR | 1993-0018967 A | 9/1993 | |
| KR | 2001-0056621 A | 7/2001 | |
| KR | 2008-0001813 A | 1/2008 | |
| KR | 2010-0117359 A | 11/2010 | |
| KR | 10-1019159 B1 | 3/2011 | |

* cited by examiner

*Primary Examiner* — Mekonnen Dagnew
(74) *Attorney, Agent, or Firm* — Harness, Dickey & Pierce, P.L.C.

(57) ABSTRACT

An image sensor includes a sensing device including a pixel array having a plurality of unit pixels, the sensing device being configured to generate pixel data in response to an incident light signal having information of an image of an object and information of an ambient light; an image data generation unit configured to generate image data corresponding to the object based on the pixel data; and an illuminance data generation unit configured to generate illuminance data corresponding to the ambient light based on the pixel data.

15 Claims, 10 Drawing Sheets

| R | G1 |
|---|----|
| G2 | B |

| R1 | G1 |
|----|----|
| G2 | R2 |

| R1 | R2 |
|----|----|
| R3 | R4 |

| Y1 | C  |
|----|----|
| M  | Y2 |

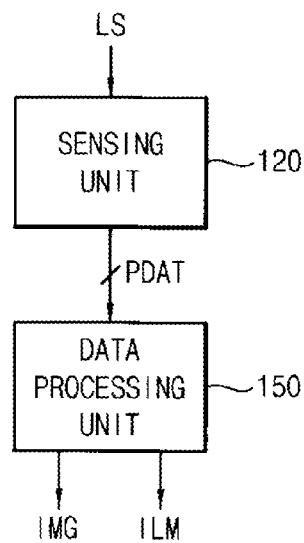
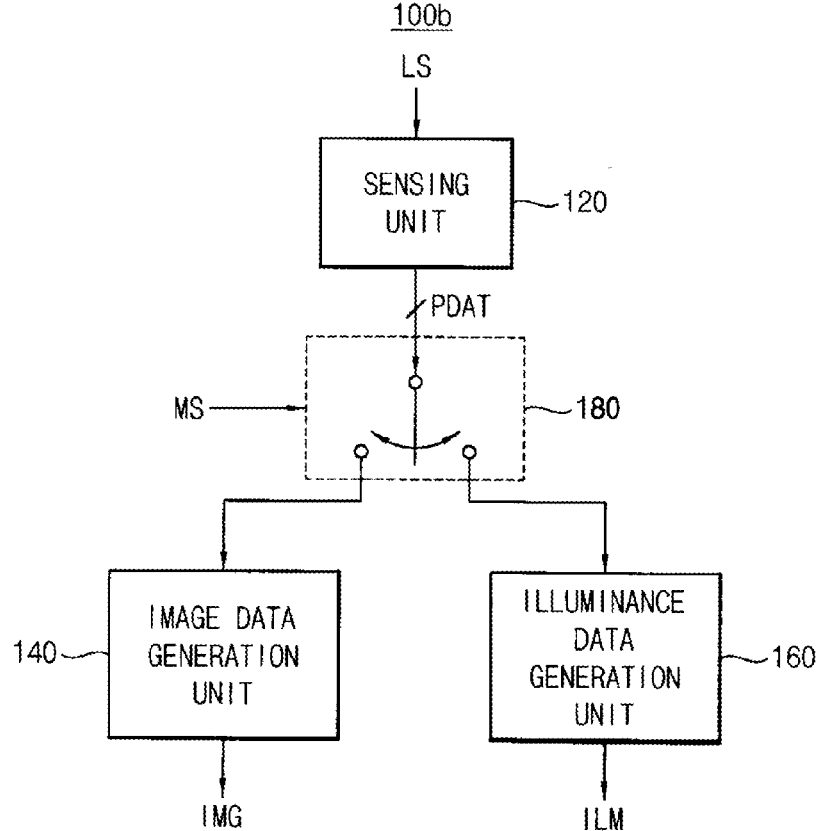

IMAGE SENSOR AND ELECTRONIC DEVICE INCLUDING THE SAME

CROSS-REFERENCE TO RELATED APPLICATION(S)

This application claims priority under 35 USC §119 to Korean Patent Application No. 10-2012-0091084, filed on Aug. 21, 2012 in the Korean Intellectual Property Office (KIPO), the contents of which are herein incorporated by reference in their entirety.

BACKGROUND

1. Technical Field

Example embodiments relate to an image sensor, and more particularly to an image sensor that is able to measure illuminance and an electronic device including the image sensor.

2. Description of the Related Art

Charge coupled device (CCD) image sensors and complementary metal oxide semiconductor (CMOS) image sensors have been used as devices for capturing an image of an object. Image sensors convert light signals into electric signals. Recently, as various kinds of electronic devices include image sensors, image sensors are required to measure illuminance of ambient light as well as to capture an image of an object.

SUMMARY

Some example embodiments are directed to provide an image sensor that is able to capture an image of an object and to measure illuminance of ambient light.

Some example embodiments are directed to provide an electronic device including the image sensor.

According to example embodiments, an image sensor includes a sensing unit, an image data generation unit, and an illuminance data generation unit. The sensing unit includes a pixel array having a plurality of unit pixels, and generates a pixel data in response to an incident light signal having information of an image of an object and information of an ambient light. The image data generation unit generates an image data corresponding to the object based on the pixel data. The illuminance data generation unit generates an illuminance data corresponding to the ambient light based on the pixel data.

In example embodiments, the illuminance data generation unit may generate the illuminance data based on an angle of view of the image sensor that is used for generating the image data.

The image data and the illuminance data may be generated at substantially the same time.

In example embodiments, the pixel array may include a plurality of ambient light sensing units each of which includes at least two adjacent unit pixels among the plurality of unit pixels, and the illuminance data generation unit may select effective sensing units among the plurality of ambient light sensing units by performing a crop operation and a sub-sampling operation on the pixel array, and generate the illuminance data based on effective pixel data, which correspond to the effective sensing units, among the pixel data.

The illuminance data generation unit may include a spectrum response compensation unit configured to extract the effective pixel data among the pixel data, and to generate a luminance data based on the effective pixel data, an automatic exposure adjustment unit configured to generate an exposure control signal, which is used for controlling an exposure time of the plurality of unit pixels, based on the luminance data, and a calculation unit configured to generate the illuminance data based on the luminance data and the exposure control signal.

The pixel data may include a plurality of pixel values corresponding to the plurality of unit pixels, respectively, and the luminance data may include a plurality of luminance values corresponding to the effective sensing units, respectively. The spectrum response compensation unit may generate a first luminance value corresponding to a first effective sensing unit based on pixel values, which correspond to unit pixels included in the first effective sensing unit, and gains for the unit pixels included in the first effective sensing unit.

The illuminance data may be proportional to a sum of the plurality of luminance values and inversely proportional to the exposure time of the plurality of unit pixels.

The illuminance data generation unit may further include a control unit configured to control the spectrum response compensation unit, the automatic exposure adjustment unit and the calculation unit.

Unit pixels included in a same effective sensing unit may include at least one of a red filter, a green filter and a blue filter.

Unit pixels included in a same effective sensing unit may include at least one of a yellow filter, a magenta filter and a cyan filter.

In example embodiments, the image data generation unit and the illuminance data generation unit may be embodied in one data processing unit.

In example embodiments, the image sensor may further comprise a mode selection unit configured to activate one of the image data generation unit and the illuminance data generation unit in response to a mode selection signal.

In example embodiments, the sensing unit may further include a correlated double sampling (CDS) unit configured to generate a plurality of CDS signals by performing a CDS operation on a plurality of analog pixel signals provided from the pixel array, and an analog-to-digital conversion unit configured to generate the pixel data by digitalizing the plurality of CDS signals.

In example embodiments, the image sensor may be a complementary metal oxide semiconductor (CMOS) image sensor.

According to example embodiments, an electronic device includes an image sensor and a display device. The image sensor generates an image data corresponding to an object and illuminance data corresponding to an ambient light in response to an incident light signal having information of an image of the object and information of the ambient light. The display device displays the object based on the image data and the illuminance data. The image sensor includes a sensing unit, an image data generation unit, and an illuminance data generation unit. The sensing unit includes a pixel array having a plurality of unit pixels, and generates a pixel data in response to the incident light signal. The image data generation unit generates the image data based on the pixel data. The illuminance data generation unit generates the illuminance data based on the pixel data.

According to at least one example embodiment, an image sensor may include a sensing device including a pixel array having a plurality of unit pixels, the sensing device being configured to generate pixel data in response to an incident light signal having information of an image of an object and information of an ambient light; an image data generation unit configured to generate image data corresponding to the object based on the pixel data; and an illuminance data generation unit configured to generate illuminance data corresponding to the ambient light based on the pixel data.

The illuminance data generation unit may be configured to generate the illuminance data based on an angle of view of the image sensor that is used for generating the image data.

The image data generation unit and the illuminance data generation unit may be configured such that the image data and the illuminance data are generated at substantially the same time.

The pixel array may include a plurality of ambient light sensing units each of which includes at least two adjacent unit pixels among the plurality of unit pixels, and the illuminance data generation unit may be configured to select effective sensing units among the plurality of ambient light sensing units by performing a crop operation and a sub-sampling operation on the pixel array, and configured to generate the illuminance data based on effective pixel data, which correspond to the effective sensing units, among the pixel data.

The illuminance data generation unit may include a spectrum response compensation unit configured to extract the effective pixel data among the pixel data, and to generate a luminance data based on the effective pixel data; an automatic exposure adjustment unit configured to generate an exposure control signal based on the luminance data; and a calculation unit configured to generate the illuminance data based on the luminance data and the exposure control signal, the sensing device being configured to control an exposure time of the plurality of unit pixels based on the exposure control signal.

The pixel data may include a plurality of pixel values corresponding to the plurality of unit pixels, respectively, the luminance data may include a plurality of luminance values corresponding to the effective sensing units, respectively, and the spectrum response compensation unit may be configured to generate a first luminance value corresponding to a first effective sensing unit based on pixel values, which correspond to unit pixels included in the first effective sensing unit, and gains for the unit pixels included in the first effective sensing unit.

The illuminance data may be proportional to a sum of the plurality of luminance values and inversely proportional to the exposure time of the plurality of unit pixels.

The illuminance data generation unit may further include a control unit configured to control the spectrum response compensation unit, the automatic exposure adjustment unit and the calculation unit.

Unit pixels included in a same effective sensing unit may include at least one of a red filter, a green filter and a blue filter.

Unit pixels included in a same effective sensing unit may include at least one of a yellow filter, a magenta filter and a cyan filter.

The image data generation unit and the illuminance data generation unit are embodied in one data processing unit.

The image sensor may further include a mode selection unit configured to activate one of the image data generation unit and the illuminance data generation unit in response to a mode selection signal.

The sensing unit may further includes a correlated double sampling (CDS) unit configured to generate a plurality of CDS signals by performing a CDS operation on a plurality of analog pixel signals provided from the pixel array; and an analog-to-digital conversion unit configured to generate the pixel data by digitalizing the plurality of CDS signals.

The image sensor may be a complementary metal oxide semiconductor (CMOS) image sensor.

According to at least one example embodiment, an electronic device may include an image sensor configured to generate image data corresponding to an object and illuminance data corresponding to an ambient light in response to an incident light signal having information of an image of the object and information of the ambient light, the image sensor including, a sensing unit including a pixel array having a plurality of unit pixels, the sensing unit generating a pixel data in response to the incident light signal, an image data generation unit configured to generate the image data based on the pixel data, and an illuminance data generation unit configured to generate the illuminance data based on the pixel data; and the electronic device may further include a display device configured to display the object based on the image data and the illuminance data.

According to at least one example embodiment, an image capture device may include a pixel array including a plurality of pixels, the pixel array being configured to convert light incident on the pixel array into pixel data, the incident light including light corresponding to an object and ambient light; an image data generation unit configured to generate image data corresponding to the object based on the pixel data; and an illuminance data generation unit configured to generate illuminance data corresponding to the ambient light based on the pixel data.

The illuminance data generation unit may be configured to generate the illuminance data based on an angle of view of the image sensor that is used for generating the image data.

The pixel array may include a plurality of ambient light sensing units, each of which includes at least two adjacent pixels among the plurality of pixels, the illuminance data generation unit may be configured to select, as effective sensing units, a sub set of the plurality of ambient light sensing units by performing a crop operation and a sub-sampling operation on the pixel array, and the illuminance data generation unit may be configured to generate the illuminance data based on effective data, the effective data being data, from among the pixel data, that corresponds to the pixels of the effective sensing units.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIGS. 5, 6A, 6B, 6C, 6D, 7A and 7B are diagrams for describing an operation of a spectrum response compensation unit included in an illuminance data generation unit of FIG. 4.

FIG. 8 is a block diagram illustrating an image sensor according to example embodiments.

FIG. 9 is a block diagram illustrating an image sensor according to example embodiments.

DETAILED DESCRIPTION OF THE EMBODIMENTS

Figure 1:
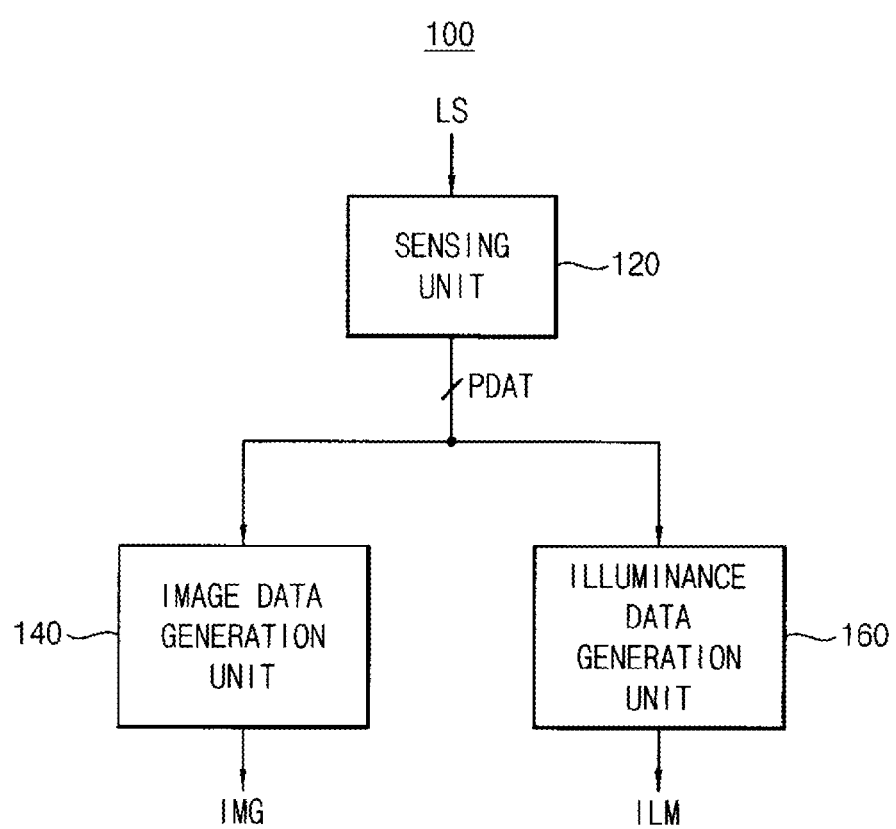
FIG. 1 is a block diagram illustrating an image sensor according to example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 is a block diagram illustrating an image sensor according to example embodiments.

Referring to FIG. 1, an image sensor 100 includes a sensing unit 120, an image data generation unit 140 and an illuminance data generation unit 160.

The sensing unit 120 includes a pixel array having a plurality of unit pixels. The sensing unit 120 generates a pixel data PDAT in response to an incident light signal LS that is arrived on the pixel array. The incident light signal LS has information of an image of an object and information of an ambient light. The pixel data PDAT may be a digital data. The pixel data PDAT may include a plurality of pixel values corresponding to the plurality of unit pixels, respectively.

In some example embodiments, the image sensor 100 may be a complementary metal oxide semiconductor (CMOS) image sensor. Hereinafter, the various exemplary embodiments will be described based on a CMOS image sensor. However, it is understood that the image sensor 100 may be other types of image sensors, including a charge-coupled device (CCD) image sensor, without departing from the scope of the present teachings.

The image data generation unit 140 generates an image data IMG corresponding to the object based on the pixel data PDAT. For example, the image data generation unit 140 may generate the image data IMG by performing an image interpolation, a color correction, a white balance adjustment, a gamma correction, a color conversion, etc. on the pixel data PDAT.

The illuminance data generation unit 160 generates illuminance data ILM corresponding to the ambient light based on the pixel data PDAT. The illuminance data ILM may correspond to a illuminance value of the ambient light. In some example embodiments, the illuminance data generation unit 160 may generate the illuminance data ILM based on an angle of view (AOV) of the image sensor 100 that is used for generating the image data IMG. That is, the image data generation unit 140 and the illuminance data generation unit 160 may generate the image data IMG and the illuminance data ILM, respectively, under a condition of a same angle of view (AOV) of the image sensor 100. In this case, the image data IMG and the illuminance data ILM may be generated at substantially the same time.

Recently, image sensors are required to measure illuminance of ambient light as well as to capture an image of an object. For this purpose, image sensors generally include a first sensing unit for capturing an image of an object and a second sensing unit for measuring illuminance of ambient light. In this case, a size of an image sensor and a cost for manufacturing an image sensor may increase.

The image sensor 100 according to example embodiments includes one sensing unit 120. That is, the image sensor 100 generates both the image data IMG corresponding to the object and the illuminance data ILM corresponding to the ambient light based on the pixel data PDAT generated from the one sensing unit 120. In addition, the image sensor 100 may generate both the image data IMG and the illuminance data ILM under a condition of a same angle of view (AOV). That is, the image sensor 100 may generate the image data IMG and the illuminance data ILM at substantially the same time without changing parameters of the image sensor 100. Therefore, the image sensor 100 may be able to capture an image of the object and to measure illuminance of the ambient light without increasing a size of the image sensor 100 and a cost for manufacturing the image sensor 100.

Figure 2:
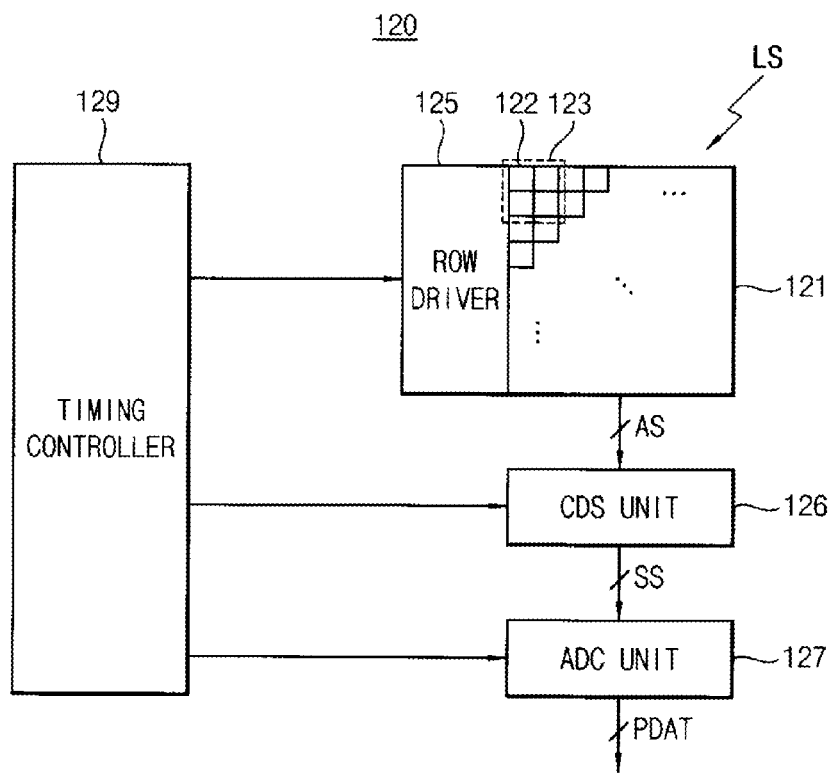
FIG. 2 is a block diagram illustrating an example of a sensing unit included in the image sensor of FIG. 1.

FIG. 2 is a block diagram illustrating an example of a sensing unit included in the image sensor of FIG. 1.

Referring to FIG. 2, the sensing unit 120 includes a pixel array 121. The sensing unit 120 may further include a row driver 125, a correlated double sampling (CDS) unit 126, an analog-to-digital conversion (ADC) unit 127 and a timing controller 129.

The pixel array 121 includes a plurality of unit pixels 122 arranged in rows and columns. The pixel array 121 may generate a plurality of analog pixel signals AS in response to the incident light signal LS having information of an image of the object and information of the ambient light.

Figure 3:
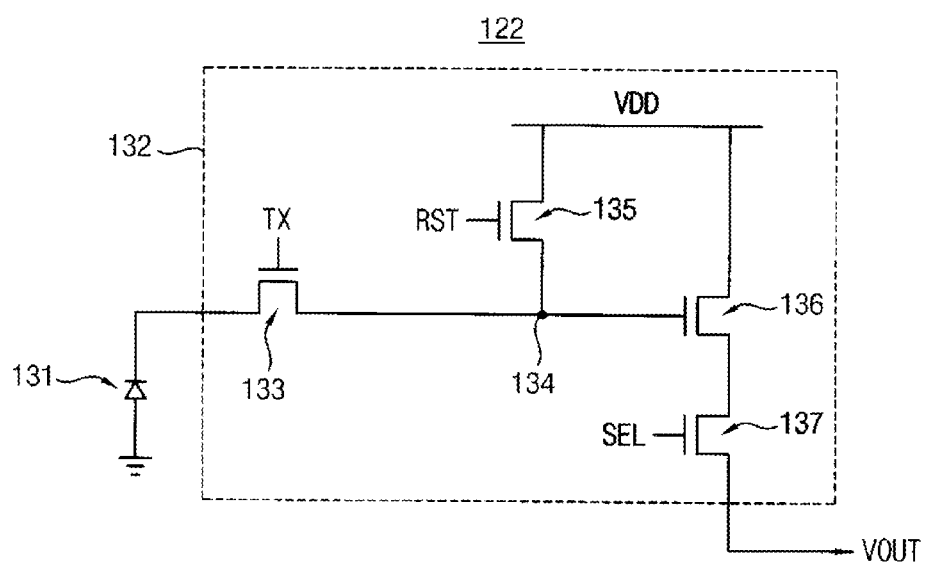
FIG. 3 is a circuit diagram illustrating an example of a unit pixel included in a sensing unit of FIG. 2.

FIG. 3 is a circuit diagram illustrating an example of a unit pixel included in a sensing unit of FIG. 2.

Referring to FIG. 3, a unit pixel 122 may include a photoelectric conversion unit 131 and a signal generation circuit 132.

The photoelectric conversion unit 131 may perform photoelectric conversion. That is, the photoelectric conversion unit 131 may convert an incident light signal into photocharges during an integration mode. For example, when the image sensor 100 is a CMOS image sensor, information of an image of an object to be captured and information of an ambient light may be obtained by collecting charge carriers (e.g., electron-hole pairs) generated from the photoelectric conversion unit 131 in response to the incident light signal passed through an open shutter of the image sensor 100 during the integration mode.

During a readout mode, the signal generation circuit 132 may generate a pixel output signal VOUT based on the photocharges generated by the photoelectric conversion. For example, when the image sensor 100 is a CMOS image sensor, the shutter is closed and the pixel output signal VOUT may be generated based on information of an image of the object and information of the ambient light, which is obtained in a form of charge carriers during the readout mode after the integration mode.

The unit pixel 122 may have various structures including, for example, a one-transistor structure, a three-transistor structure, a four-transistor structure, a five-transistor structure, a structure in which some transistors are shared by multiple unit pixels, etc. FIG. 3 illustrates the four-transistor structure, according to an exemplary embodiment, for purposes of discussion. The signal generation circuit 132 may include a transfer transistor 133, a reset transistor 135, a drive transistor 136, and a selective transistor 137. The signal generation circuit 132 may also include a floating diffusion (FD) node 134.

The transfer transistor 133 may include a first electrode connected to the photoelectric conversion unit 131, a second electrode connected to the FD node 134, and a gate electrode to which a transfer signal TX is applied. The reset transistor 135 may include a first electrode to which a power supply voltage VDD is applied, a second electrode connected to the FD node 134, and a gate electrode to which a reset signal RST is applied. The drive transistor 136 may include a first terminal to which the power supply voltage VDD is applied, a gate electrode connected to the FD node 134, and a second electrode connected to the selective transistor 137. The selective transistor 137 may include a first electrode connected to the second electrode of the drive transistor 136, a gate electrode to which a select signal SEL is applied, and a second electrode from which the pixel output signal VOUT is output.

Referring again to FIG. 2, the pixel array 121 may include a plurality of ambient light sensing units 123. Each of the plurality of ambient light sensing units 123 may include at least two adjacent unit pixels among the plurality of unit pixels 122. For example, each of the plurality of ambient light sensing units 123 may include four unit pixels arranged in a 2×2 formation. The illuminance data generation unit 160 included in the image sensor 100 of FIG. 1 may generate the illuminance data ILM based on the plurality of ambient light sensing units 123. A structure and an operation of the illuminance data generation unit 160 will be described below with reference to FIG. 4.

The row driver 125, the CDS unit 126, the ADC unit 127 and a timing controller 129 may form a signal processing unit of the sensing unit 120. The signal processing unit may generate the pixel data PDAT, which is a digital data, by processing the plurality of analog pixel signals AS.

The row driver 125 may be connected to each row of the pixel array 121. The row driver 125 may generate driving signals to drive each row. For example, the row driver 125 may drive the plurality of unit pixels included in the pixel array 121 in the unit of a row.

The CDS unit 126 may generate a plurality of CDS signals SS by performing a CDS operation on the plurality of analog pixel signals AS provided from the pixel array 121. For example, the CDS unit 126 may perform the CDS operation by obtaining a difference between a voltage level representing a reset component of each pixel signal and a voltage level representing an image component and an ambient light component of each pixel signal, to generate the plurality of CDS signals SS corresponding to effective signal components. The CDS unit 126 may include a plurality of CDS circuits connected to column lines of the pixel array 121, respectively, and output the plurality of CDS signals SS corresponding to columns of the pixel array 121, respectively.

The ADC unit 127 may generate the pixel data PDAT by digitalizing the plurality of CDS signals SS. The ADC unit 127 may include a counter and a buffer unit. The counter may generate counting signals by performing a counting operation with respect to reset and image components of the pixel signals, and provide the counting signals to the buffer unit. The buffer unit may include a plurality of latch circuits connected to the column lines, respectively, latch the counting signals using the plurality of latch circuits, and output the latched counting signals as the pixel data PDAT.

The timing controller 129 may control the row driver 125, the CDS unit 126, and the ADC unit 127. The timing controller 129 may provide control signals, such as a clock signal, a timing control signal, etc., to the row driver 125, the CDS unit 126, and the ADC unit 127. In some example embodiments, the timing controller 129 may include a logic control circuit, a phase locked loop (PLL) circuit, a timing control circuit, a communication interface circuit, etc.

The sensing unit 120 may further include a voltage generation unit generating various voltage signals such as a reference voltage, a ramp voltage, etc.

In an example embodiment of FIG. 2, the sensing unit 120 may perform an analog double sampling. In other example embodiments, the sensing unit 120 may perform a digital double sampling in which an analog reset signal and an analog data signal are converted into digital signals and a difference between the two digital signals is obtained to represent an effective signal component. In other example embodiments, the sensing unit 120 may perform a dual correlated double sampling in which both an analog double sampling and a digital double sampling are performed.

Figure 4:
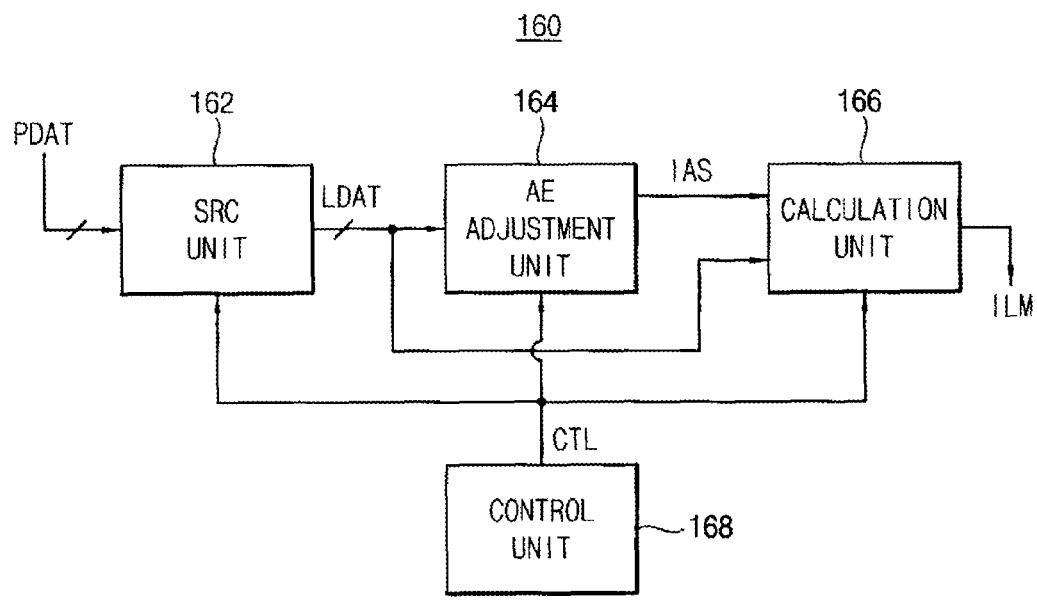
FIG. 4 is a block diagram illustrating an example of an illuminance data generation unit included in the image sensor of FIG. 1.

FIG. 4 is a block diagram illustrating an example of an illuminance data generation unit included in the image sensor of FIG. 1.

Referring to FIGS. 2 and 4, the illuminance data generation unit 160 may include a spectrum response compensation (SRC) unit 162, an automatic exposure (AE) adjustment unit 164 and a calculation unit 166. The illuminance data generation unit 160 may further include a control unit 168.

The illuminance data generation unit 160 may select effective sensing units among the plurality of ambient light sensing units 123 of FIG. 2 by performing a crop operation and a sub-sampling operation on the pixel array 121, and generate the illuminance data ILM based on effective pixel data, which correspond to the effective sensing units, among the pixel data PDAT.

The spectrum response compensation unit 162 may extract the effective pixel data among the pixel data PDAT based on the crop operation and the sub-sampling operation, and generate a luminance data LDAT based on the effective pixel data.

FIGS. 5, 6A, 6B, 6C, 6D, 7A and 7B are diagrams for describing an operation of a spectrum response compensation unit included in an illuminance data generation unit of FIG. 4.

Figure 5:
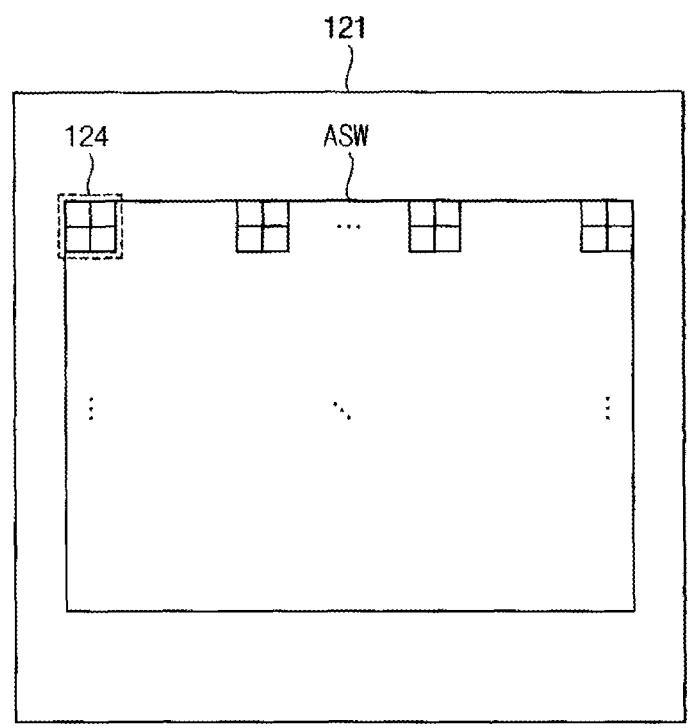
Figure 7A:
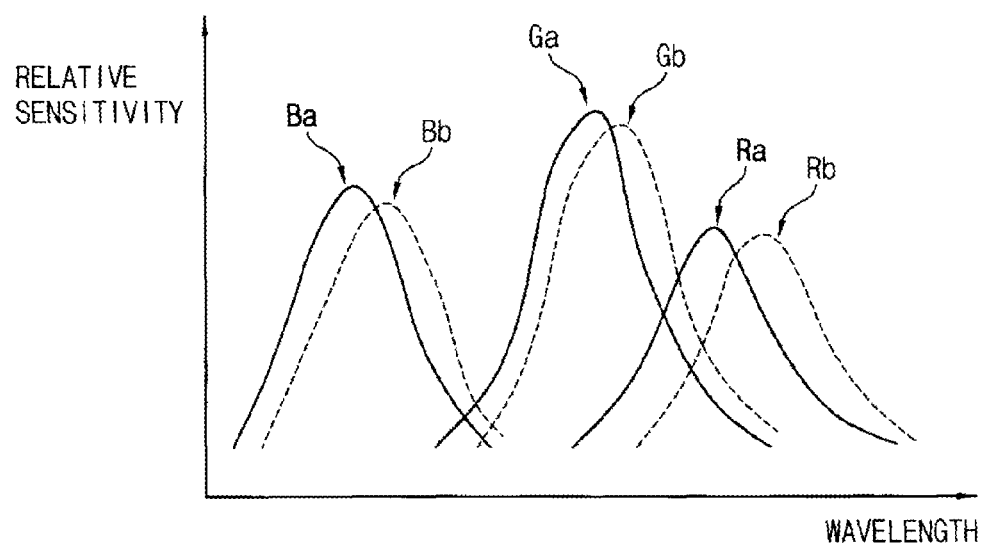
Figure 7B:
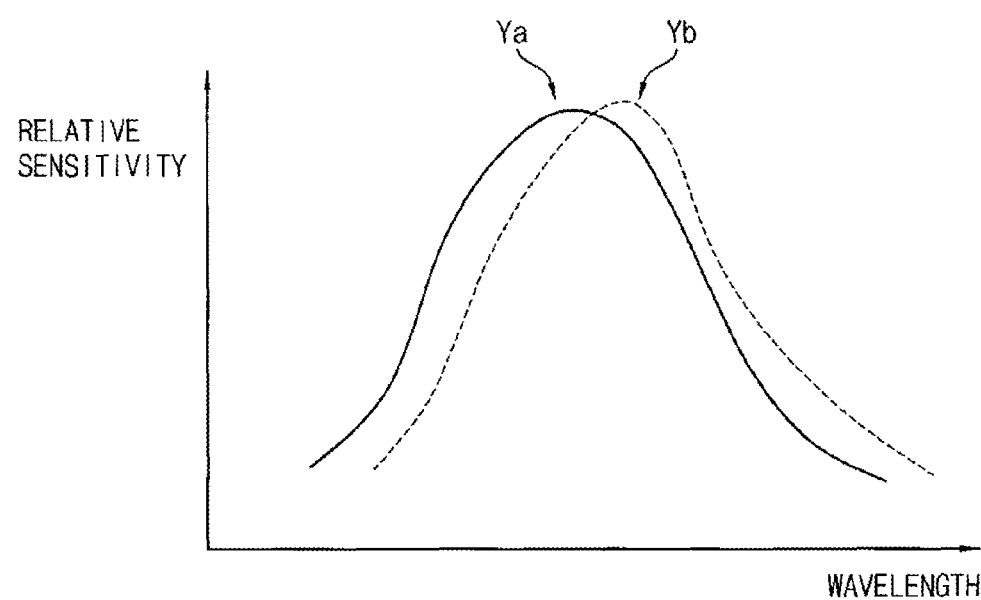

FIG. 5 is a diagram for describing a crop operation and a sub-sampling operation. FIGS. 6A, 6B, 6C and 6D are diagrams for describing a structure of an effective sensing unit. FIGS. 7A and 7B are diagrams for describing a generation of the luminance data LDAT.

Referring to FIGS. 2, 4 and 5, the spectrum response compensation unit 162 may set a sensing window ASW by performing a crop operation on the pixel array 121. For example, the pixel array 121 may have a size of 1412×1412, and the sensing window ASW may have a size of 1280×1024. The spectrum response compensation unit 162 may select effective sensing units 124 among the plurality of ambient light sensing units 123 by performing a sub-sampling operation on the sensing window ASW. For example, the spectrum response compensation unit 162 may select 80×64 effective sensing units 124 by performing a 1/16 sub-sampling operation on the sensing window ASW having a size of 1280×1024. The spectrum response compensation unit 162 may extract the effective pixel data, which correspond to the effective sensing units 124, among the pixel data PDAT. As described above, the pixel data PDAT may include a plurality of pixel values corresponding to the plurality of unit pixels, respectively. Therefore, the effective pixel data may include pixel values corresponding to unit pixels included in the effective sensing units 124.

As described above, the illuminance data generation unit 160 included in the image sensor 100 may not generate the illuminance data ILM based on all of the pixel data PDAT but generate the illuminance data ILM based on the effective pixel data extracted from the pixel data PDAT based on the crop operation and the sub-sampling operation. Therefore, the image sensor 100 may reduce power consumption.

Referring to FIGS. 2, 6A, 6B and 6C, unit pixels included in a same effective sensing unit 124 may include at least one of a red filter, a green filter and a blue filter according to a bayer pattern.

Figures 6A, 6B:
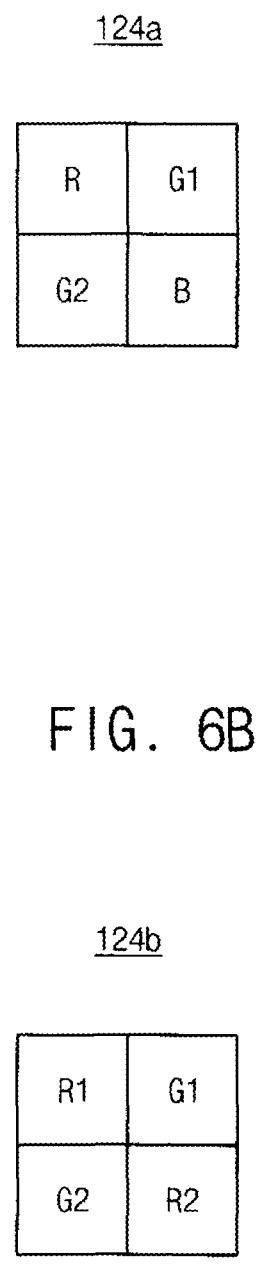
Figures 6C, 6D:
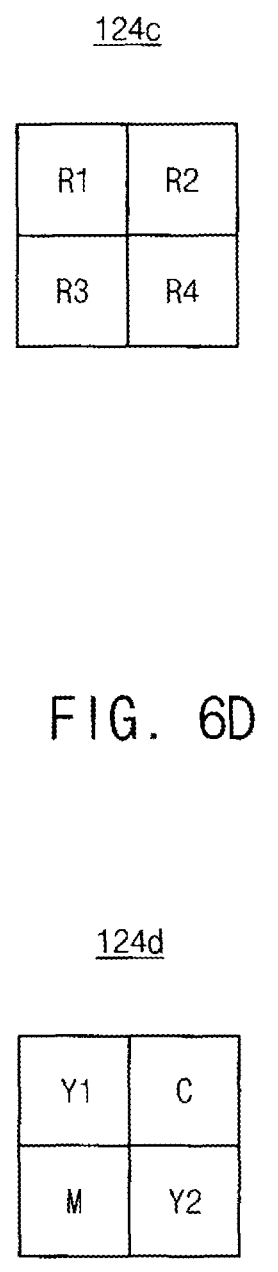

In some example embodiments, as illustrated in FIG. 6A, unit pixels included in the effective sensing unit 124a may include a red filter, a green filter and a blue filter. That is, the effective sensing unit 124a of FIG. 6A may include one red pixel R, two green pixels G1 and G2, and one blue pixel B. In other example embodiments, as illustrated in FIG. 6B, unit pixels included in the effective sensing unit 124b may include a red filter and a green filter. That is, the effective sensing unit 124b of FIG. 6B may include two red pixels R1 and R2, and two green pixels G1 and G2. In still other example embodiments, as illustrated in FIG. 6C, unit pixels included in the effective sensing unit 124c may include a red filter. That is, the effective sensing unit 124c of FIG. 6C may include four red pixels R1, R2, R3 and R4. Similarly, one effective sensing unit 124 may include any combination of a red pixel, a green pixel and a blue pixel.

Referring to FIGS. 2 and 6D, unit pixels included in a same effective sensing unit 124 may include at least one of a yellow filter, a magenta filter and a cyan filter.

In some example embodiments, as illustrated in FIG. 6D, unit pixels included in the effective sensing unit 124d may include a yellow filter, a magenta filter and a cyan filter. That is, the effective sensing unit 124d of FIG. 6D may include two yellow pixels Y1 and Y2, one magenta pixel M, and one cyan pixel C. According to example embodiments, one effective sensing unit 124 may include two yellow pixels and two cyan pixels, or include any combination of a yellow pixel, a magenta pixel and a cyan pixel.

Referring to FIGS. 4, 5, 7A and 7B, the spectrum response compensation unit 162 may perform a spectrum response compensation on the effective pixel data and generate the luminance data LDAT based on the compensated effective pixel data. The luminance data LDAT may include a plurality of luminance values corresponding to the effective sensing units 124, respectively. For example, the spectrum response compensation unit 162 may generate a first luminance value corresponding to a first effective sensing unit among the effective sensing units 124 based on pixel values, which correspond to unit pixels included in the first effective sensing unit, and gains for the unit pixels included in the first effective sensing unit.

For example, when the effective sensing units 124 include one red pixel R, two green pixels G1 and G2, and one blue pixel B as illustrated in FIG. 6A, the spectrum response compensation unit 162 may extract pixel values among the pixel data PDAT that correspond to unit pixels R, G1, G2 and B included in the first effective sensing units 124a. The spectrum response compensation unit 162 may perform the spectrum response compensation on the pixel values corresponding to the unit pixels R, G1, G2 and B included in the first effective sensing units 124a, and generate the first illuminance value corresponding to the first effective sensing unit 124a using [Equation 1].

$$YD=RG*RD+GG*(GD1+GD2)+BG*BD \quad \text{[Equation 1]}$$

In [Equation 1], YD represents the first illuminance value corresponding to the first effective sensing unit 124a, RG represents a gain of the red pixel R, RD represents a pixel value of the red pixel R, GG represents a gain of the green pixels G1 and G2, GD1 represents a gain of the first green pixel G1, GD2 represents a gain of the second green pixel G2, BG represents a gain of the blue pixel B, and BD represents a pixel value of the blue pixel B. The gain of the red pixel RG, the gain of the green pixels GG and the gain of the blue pixel BG may be predetermined, for example determined during manufacture of the sensing unit 120, according to characteristics of a manufacturing process of the pixel array 121.

In this case, as illustrated in FIG. 7A, spectrum responses Ra, Ga and Ba may be obtained based on the pixel values corresponding to the unit pixels R, G1, G2 and B included in the first effective sensing units 124a, and compensated spectrum response Rb, Gb and Bb may be obtained by performing the spectrum response compensation on the spectrum responses Ra, Ga and Ba. In addition, as illustrated in FIG. 7B, a spectrum response Ya may be obtained based on the [Equation 1] and the spectrum responses Ra, Ga and Ba, a compensated spectrum response Yb may be obtained based on the [Equation 1] and the compensated spectrum responses Rb, Gb and Bb. The compensated spectrum response Yb may correspond to the first luminance value corresponding to the first effective sensing unit 124a. The compensated spectrum response Yb may have a waveform similar to a waveform of a human eye response.

As described above, the spectrum response compensation unit 162 may generate a plurality of luminance values corresponding to the effective sensing units 124, respectively, and generate the luminance data LDAT including the plurality of luminance values. For example, when spectrum response compensation unit 162 selects 80×64 effective sensing units 124 among the plurality of ambient light sensing units 123 based on the crop operation and the sub-sampling operation, the luminance data LDAT generated by the spectrum response compensation unit 162 may include 80×64 luminance values.

In an operation of the spectrum response compensation unit 162 described above with reference to FIGS. 5, 6A, 6B, 6C, 6D, 7A and 7B, a size of the pixel array 121, a size of the sensing window ASW, a ratio of the sub-sampling operation, a structure of the effective sensing units 124, etc. may be changed according to example embodiments. In addition, in some example embodiments, the spectrum response compensation unit 162 may divide the sensing window ASW into a plurality of sub sensing windows and generate the luminance data LDAT for each of the plurality of sub sensing windows. In this case, the image data generation unit 140 may detect a motion of the object based on the plurality of sub sensing windows.

Referring again to FIGS. 2 and 4, the automatic exposure adjustment unit 164 may generate an exposure control signal IAS, which is used for controlling an exposure time of the plurality of unit pixels 122, based on the luminance data LDAT. For example, as the luminance values included in the luminance data LDAT increase, the exposure time of the plurality of unit pixels 122 may decrease. The exposure control signal IAS may be provided to the timing controller 129, and the timing controller 129 may control the exposure time of the plurality of unit pixels 122 based on the exposure control signal IAS.

Conventional ambient light sensors include unit pixels having relatively large charge storing capacity. Therefore, the conventional ambient light sensors operate correctly without saturating the unit pixels although an exposure time of the unit pixels is fixed. However, as charge storing capacity of the unit pixels decreases, the unit pixels may saturate according to the intensity of the ambient light. In the image sensor 100 according to example embodiments, the illuminance data generation unit 160 may include the automatic exposure adjustment unit 164 that controls the exposure time of the plurality of unit pixels 122 based on the exposure control signal IAS. Therefore, the image sensor 100 may operate correctly without saturating the unit pixels 122 even though the intensity of the ambient light is relatively high.

The calculation unit 166 may generate the illuminance data ILM based on the luminance data LDAT and the exposure control signal IAS. For example, the illuminance data ILM may be determined using [Equation 2].

$$ILMD=(G1*AYD)/(G2*IT*AG)$$ [Equation 2]

In the [Equation 2], ILMD represents a value of the illuminance data ILM, G1 and G2 represent compensation coefficients for the value of the illuminance data ILM, AYD represents a sum of the plurality of luminance values included in the luminance data LDAT, IT represents the exposure time of the plurality of unit pixels 122, AG represents an analog gain for the sensing unit 120 of FIG. 2. For example, G1 may represent a first compensation coefficient for a chip-wise compensation, and G2 may represent a second compensation coefficient for a product-wise compensation. G1 and G2 may be predetermined, for example during manufacture of the image sensor 100, according to characteristics of a manufacturing process of the image sensor 100 and an electronic device including the image sensor 100. According to example embodiments, G1 and G2 may be switched with each other in the [Equation 2]. As illustrated in the [Equation 2], the value of the illuminance data ILM may be proportional to the sum of the plurality of luminance values AYD and inversely proportional to the exposure time of the plurality of unit pixels IT regardless of G1 and G2.

The control unit 168 may control the spectrum response compensation unit 162, the automatic exposure adjustment unit 164 and the calculation unit 166. The control unit 168 may provide a control signal CTL, such as a clock signal, a timing control signal, a power enable signal, etc., to the spectrum response compensation unit 162, the automatic exposure adjustment unit 164 and the calculation unit 166.

FIG. 8 is a block diagram illustrating an image sensor according to example embodiments.

Referring to FIG. 8, an image sensor 100a includes a sensing unit 120 and a data processing unit 150.

The image sensor 100a of FIG. 8 may be substantially the same as the image sensor 100 of FIG. 1 except that the image data generation unit 140 and the illuminance data generation unit 160 of the image sensor 100 are embodied in one data processing unit 150 of the image sensor 100a. That is, the image sensor 100 of FIG. 1 includes two paths for processing the pixel data PDAT generated from the sensing unit 120, and the image sensor 100a of FIG. 8 includes one path for processing the pixel data PDAT.

The sensing unit 120 includes a pixel array having a plurality of unit pixels. The sensing unit 120 generates a pixel data PDAT in response to an incident light signal LS that is arrived on the pixel array. The incident light signal LS has information of an image of an object and information of an ambient light.

The data processing unit 150 generates an image data IMG corresponding to the object and illuminance data ILM corresponding to the ambient light based on the pixel data PDAT. For example, the data processing unit 150 may generate the image data IMG by performing an image interpolation, a color correction, a white balance adjustment, a gamma correction, a color conversion, etc. on the pixel data PDAT, and generate the illuminance data ILM based on an angle of view (AOV) of the image sensor 100a that is used for generating the image data IMG. That is, the data processing unit 150 may generate the image data IMG and the illuminance data ILM under a condition of a same angle of view (AOV) of the image sensor 100a. Therefore, the image data IMG and the illuminance data ILM may be generated at substantially the same time. The illuminance data ILM may be generated in the way described above with reference to FIGS. 4, 5, 6A, 6B, 6C, 6D, 7A and 7B.

FIG. 9 is a block diagram illustrating an image sensor according to example embodiments.

Referring to FIG. 9, an image sensor 100b includes a sensing unit 120, an image data generation unit 140, an illuminance data generation unit 160 and a mode selection unit 180.

The image sensor 100b of FIG. 9 may be substantially the same as the image sensor 100 of FIG. 1 except that the image sensor 100b further includes the mode selection unit 180. That is, the image sensor 100 of FIG. 1 activates two paths simultaneously for processing the pixel data PDAT generated from the sensing unit 120, and the image sensor 100b of FIG. 9 activates two paths alternatively for processing the pixel data PDAT.

The sensing unit 120 includes a pixel array having a plurality of unit pixels. The sensing unit 120 generates a pixel data PDAT in response to an incident light signal LS that is arrived on the pixel array. The incident light signal LS has information of an image of an object and information of an ambient light. The image data generation unit 140 generates an image data IMG corresponding to the object based on the pixel data PDAT. The illuminance data generation unit 160 generates illuminance data ILM corresponding to the ambient light based on the pixel data PDAT. The illuminance data ILM may be generated in the way described above with reference to FIGS. 4, 5, 6A, 6B, 6C, 6D, 7A and 7B.

The mode selection unit 180 may activate one of the image data generation unit 140 and the illuminance data generation unit 160 in response to a mode selection signal MS. For example, the mode selection unit 180 may include a switch. The switch may connect the sensing unit 120 to the image data generation unit 140 to activate the image data generation unit 140 when mode selection signal MS is in a first logic level (e.g., logic high level), and the image data generation unit 140 may generate the image data IMG corresponding to the object based on the pixel data PDAT. The switch may connect the sensing unit 120 to the illuminance data generation unit 160 to activate the illuminance data generation unit 160 when mode selection signal MS is in a second logic level (e.g., logic low level), and the illuminance data generation unit 160 may generate the illuminance data ILM corresponding to the ambient light based on the pixel data PDAT. That is, the image data IMG and the illuminance data ILM may not be generated at substantially the same time.

Figure 10:
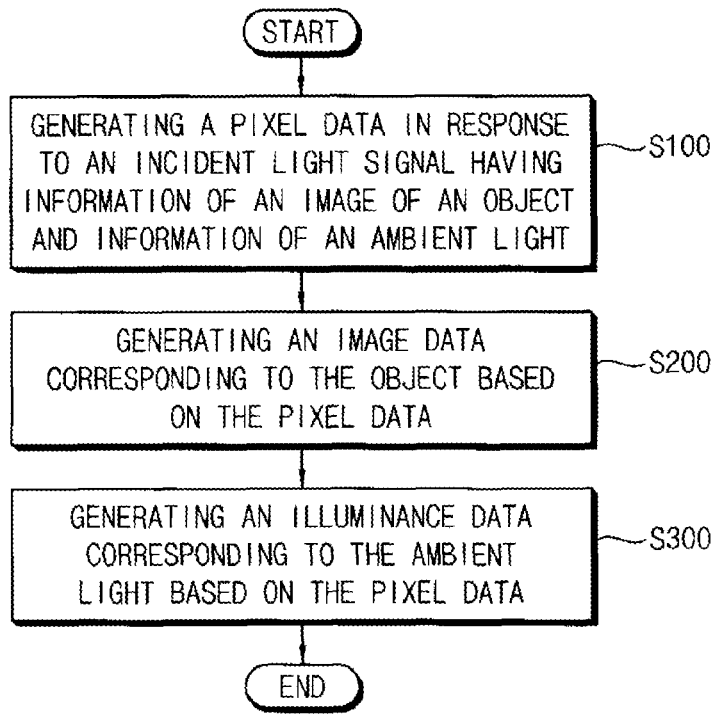
FIG. 10 is a flow chart illustrating a method of driving an image sensor according to example embodiments.

FIG. 10 is a flow chart illustrating a method of driving an image sensor according to example embodiments.

Referring to FIGS. 1, 2 and 10, in a method of driving an image sensor according to example embodiments, the pixel data PDAT is generated in response to the incident light signal LS that is arrived on the pixel array 121 and has information of an image of the object and information of the ambient light (step S100). For example, the pixel array 121 may generate the plurality of analog pixel signals AS in response to the incident light signal LS, the CDS unit 126 may generate the plurality of CDS signals SS by performing the CDS operation on the plurality of analog pixel signals AS provided from the pixel array 121, and the ADC unit 127 may generate the pixel data PDAT by digitalizing the plurality of CDS signals SS.

The image data IMG corresponding to the object is generated based on the pixel data PDAT (step S200). For example, the image data generation unit 140 may generate the image data IMG by performing an image interpolation, a color correction, a white balance adjustment, a gamma correction, a color conversion, etc. on the pixel data PDAT.

The illuminance data ILM corresponding to the ambient light is generated based on the pixel data PDAT (step S300). For example, the illuminance data generation unit 160 may generate the illuminance data ILM based on an angle of view (AOV) of the image sensor 100 that is used for generating the image data IMG. The image data IMG and the illuminance data ILM may be generated at substantially the same time.

Figure 11:
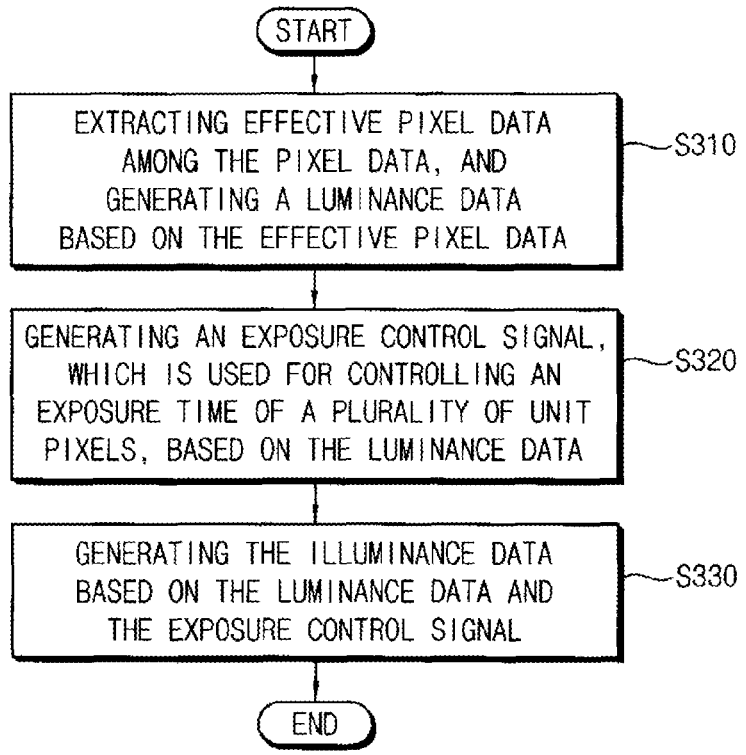
FIG. 11 is a flow chart illustrating an example of a step of generating illuminance data of FIG. 10.

FIG. 11 is a flow chart illustrating an example of a step of generating illuminance data of FIG. 10.

Referring to FIGS. 2, 4, 5, 7A, 7B, 10 and 11, for generating the illuminance data ILM, the effective pixel data may be extracted from the pixel data PDAT and the luminance data LDAT may be generated based on the effective pixel data (step S310). For example, the pixel array 121 may include the plurality of ambient light sensing units 123. Each of the plurality of ambient light sensing units 123 may include at least two adjacent unit pixels among the plurality of unit pixels 122. The spectrum response compensation unit 162 may select effective sensing units 124 among the plurality of ambient light sensing units 123 by performing a crop operation and a sub-sampling operation on the pixel array 121, extract the effective pixel data, which correspond to the unit pixels included in the effective sensing units 124, among the pixel data PDAT, perform a spectrum response compensation on the effective pixel data, and generate the luminance data LDAT including a plurality of luminance values based on the compensated effective pixel data and the [Equation 1].

The exposure control signal IAS, which is used for controlling an exposure time of the plurality of unit pixels 122, may be generated based on the luminance data LDAT (step S320). The illuminance data ILM may be generated based on the luminance data LDAT and the exposure control signal IAS (step S330). The illuminance data ILM may be determined using the [Equation 2]. The value of the illuminance data ILM may be proportional to the sum of the plurality of luminance values and inversely proportional to the exposure time of the plurality of unit pixels.

Figure 12:
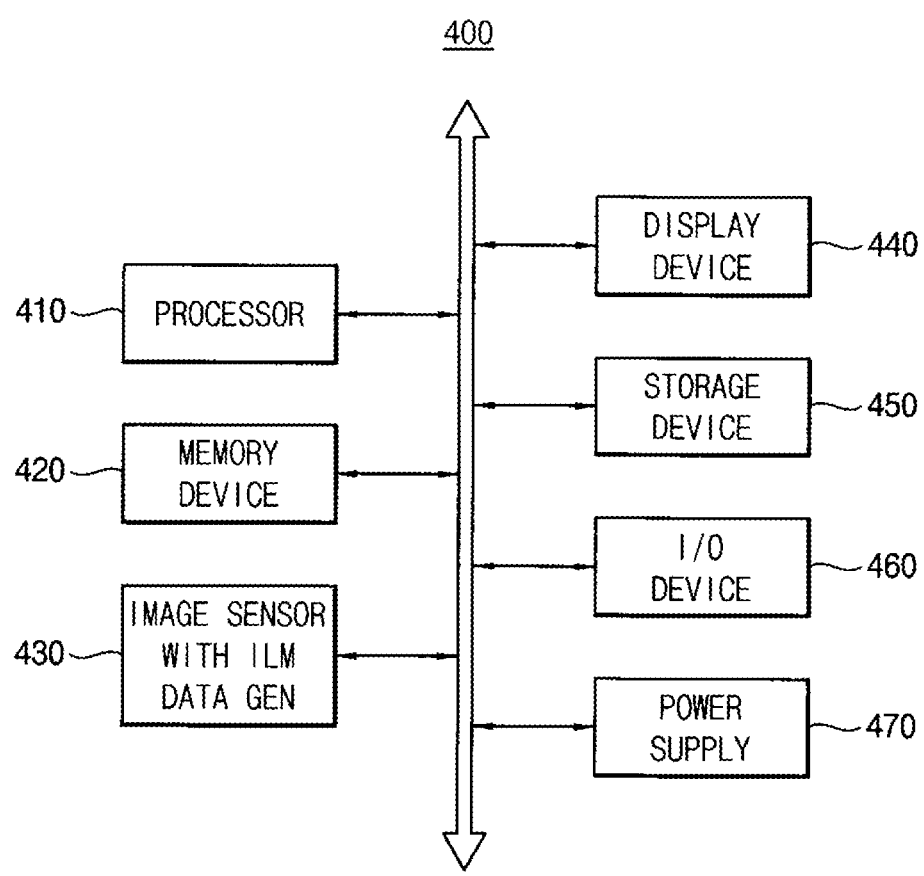
FIG. 12 is a block diagram illustrating an electronic device according to example embodiments.

FIG. 12 is a block diagram illustrating an electronic device according to example embodiments.

Referring to FIG. 12, an electronic device 400 includes an image sensor 430 and a display device 440. The electronic device 400 may further include a processor 410, a memory device 420, a storage device 450, an input/output device 460, and a power supply 470.

The processor 410 may perform various computing functions, such as executing specific software for performing specific calculations or tasks. For example, the processor 410 may be a microprocessor or a central process unit. The processor 410 may be connected to the storage device 450, the memory device 420, the display device 440 and the input/output device 460 via bus such as an address bus, a control bus or a data bus, etc. The processor 410 may be connected to an extended bus, such as peripheral component interconnect (PCI) bus.

The memory device 420 may store data required for an operation of the electronic device 400. The memory device 420 may be, for example, a dynamic random access memory (DRAM), a static random access memory (SRAM), or a non-volatile memory, such as an erasable programmable read-only memory (EPROM), an electrically erasable programmable read-only memory (EEPROM), a flash memory, etc.

The storage device 450 may include, for example, a solid state drive, a flash memory device, a hard disk drive, a compact disk read-only memory (CD-ROM) drive, etc. The input/output device 460 may include a keyboard, a mouse, a printer, a display device, etc. The power supply 470 may supply operational power.

The image sensor 430 may be connected to the processor 410 through one or more of the above buses or other communication links to communicate with the processor 410. The image sensor 430 may generate an image data corresponding to an object to be captured and illuminance data corresponding to an ambient light in response to an incident light signal having information of an image of the object and information of the ambient light. The image sensor 430 may be embodied as one of the image sensor 100 of FIG. 1, the image sensor 100a of FIG. 8, and the image sensor 100b of FIG. 9. That is, the image sensor 430 includes one sensing unit, and generates both the image data corresponding to the object and the illuminance data corresponding to the ambient light based on the pixel data generated from the one sensing unit. In addition, the image sensor 430 may generate both the image data and the illuminance data under a condition of a same angle of view (AOV). That is, the image sensor 430 may generate the image data and the illuminance data at substantially the same time without changing parameters of the image sensor 430. Therefore, the image sensor 430 may be able to capture an image of the object and to measure illuminance of the ambient light without increasing a size of the image sensor 430 and a cost for manufacturing the image sensor 430. In addition, the image sensor 430 may generate the illuminance data based on the effective pixel data extracted from the pixel data based on the crop operation and the sub-sampling operation. Therefore, the image sensor 430 may reduce power consumption.

The display device 440 may display the object based on the image data and the illuminance data. The display device 440 may include a liquid crystal display (LCD) panel, an organic light emitting display (OLED) panel, a plasma display panel (PDP), etc.

The electronic device 400 and/or components of the electronic device 400 may be packaged in various forms, including for example a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline (SOIC), a shrink small outline package (SSOP), a thin small outline (TSOP), a thin quad flatpack (TQFP), a system in package (SIP), a multi chip package (MCP), a wafer-level fabricated package (WFP), or a wafer-level processed stack package (WSP).

The electronic device 400 may be any mobile system including, for example, a mobile phone, a smart phone, a personal digital assistant (FDA), a portable multimedia player (PMP), a digital camera, a camcorder, a music player, a portable game console, a navigation system, etc., or arbitrary computing systems, such as a personal computer, a workstation, a laptop computer, a digital television, etc.

Although not illustrated in FIG. 12, the electronic device 400 may further include ports to communicate with a video card, a sound card, a memory card, a universal serial bus (USB) device, etc. The electronic device 400 may further include a baseband chipset, an application chipset, etc.

Figure 13:
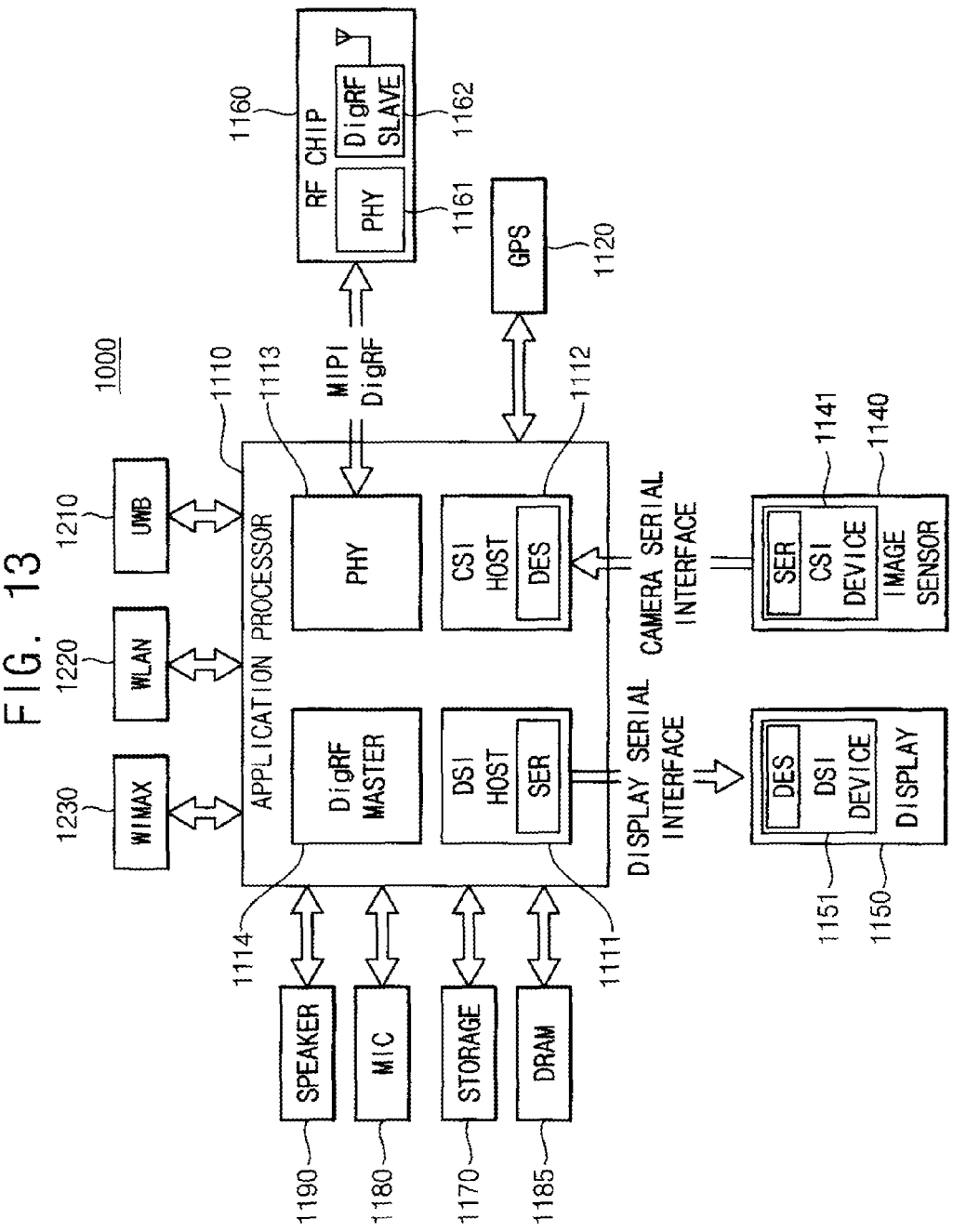
FIG. 13 is a block diagram illustrating an example of an interface used in the electronic device of FIG. 12.

FIG. 13 is a block diagram illustrating an example of an interface used in the electronic device of FIG. 12.

Referring to FIG. 13, an electronic device 1000 may be implemented by a data processing device (e.g., a cellular phone, a personal digital assistant, a portable multimedia player, a smart phone, etc.) that uses or supports a mobile industry processor interface (MIPI) interface. The electronic device 1000 may include an application processor 1110, an image sensor 1140, a display device 1150, etc.

A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI). In some example embodiments, the DSI host 1111 may include a serializer (SER), and the DSI device 1151 may include a deserializer (DES).

The electronic device 1000 may further include a radio frequency (RF) chip 1160 performing a communication with the application processor 1110. A physical layer (PHY) 1113 of the electronic device 1000 and a physical layer (PHY) 1161 of the RF chip 1160 may perform data communications based on a MIPI DigRF. The application processor 1110 may further include a DigRF MASTER 1114 that controls the data communications according to the MIPI DigRF of the PHY 1161, and the RF chip 1160 may further include a DigRF SLAVE 1162 controlled by the DigRF MASTER 1114.

The electronic device 1000 may further include a global positioning system (GPS) 1120, a storage 1170, a MIC 1180, a DRAM device 1185, and a speaker 1190. In addition, the electronic device 1000 may perform communications using an ultra wideband (UWB) 1210, a wireless local area network (WLAN) 1220, a worldwide interoperability for microwave access (WIMAX) 1230, etc. However, the structure and the interface of the electronic device 1000 are not limited thereto.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor, comprising:
    a sensing device including a pixel array having a plurality of unit pixels, the sensing device being configured to generate pixel data in response to an incident light signal having information of an image of an object and information of an ambient light;
    an image data generation unit configured to generate image data corresponding to the object based on the pixel data; and
    an illuminance data generation unit configured to generate illuminance data corresponding to the ambient light based on the pixel data,
    the plurality of pixels including first pixels,
    the pixel data including first data generated based on light incident on the first pixels,
    both the image data and the illuminance data being generated based on the first data,
    wherein the pixel array includes a plurality of ambient light sensing units each of which includes at least two adjacent unit pixels among the plurality of unit pixels,
    wherein the illuminance data generation unit is configured to select effective sensing units among the plurality of ambient light sensing units by performing a crop operation and a sub-sampling operation on the pixel array, and configured to generate the illuminance data based on effective pixel data, which correspond to the effective sensing units, among the pixel data, and
    wherein the illuminance data generation unit includes,
        a spectrum response compensation unit configured to extract the effective pixel data among the pixel data, and to generate a luminance data based on the effective pixel data;
        an automatic exposure adjustment unit configured to generate an exposure control signal based on the luminance data; and
        a calculation unit configured to generate the illuminance data based on the luminance data and the exposure control signal,
    the sensing device being configured to control an exposure time of the plurality of unit pixels based on the exposure control signal.

2. The image sensor of claim 1, wherein the illuminance data generation unit is configured to generate the illuminance data based on an angle of view of the image sensor that is used for generating the image data.

3. The image sensor of claim 2, wherein the image data generation unit and the illuminance data generation unit are configured such that the image data and the illuminance data are generated at substantially the same time.

4. The image sensor of claim 1, wherein the pixel data includes a plurality of pixel values corresponding to the plurality of unit pixels, respectively, and the luminance data includes a plurality of luminance values corresponding to the effective sensing units, respectively, and
    wherein the spectrum response compensation unit is configured to generate a first luminance value corresponding to a first effective sensing unit based on pixel values, which correspond to unit pixels included in the first effective sensing unit, and gains for the unit pixels included in the first effective sensing unit.

5. The image sensor of claim 4, wherein the illuminance data is proportional to a sum of the plurality of luminance values and inversely proportional to the exposure time of the plurality of unit pixels.

6. The image sensor of claim 1, wherein the illuminance data generation unit further includes:
    a control unit configured to control the spectrum response compensation unit, the automatic exposure adjustment unit and the calculation unit.

7. The image sensor of claim 1, wherein unit pixels included in a same effective sensing unit include at least one of a red filter, a green filter and a blue filter.

8. The image sensor of claim 1, wherein unit pixels included in a same effective sensing unit include at least one of a yellow filter, a magenta filter and a cyan filter.

9. The image sensor of claim 1, wherein the image data generation unit and the illuminance data generation unit are embodied in one data processing unit.

10. The image sensor of claim 1, further comprising:
    a mode selection unit configured to activate one of the image data generation unit and the illuminance data generation unit in response to a mode selection signal.

11. The image sensor of claim 1, wherein the sensing unit further includes:
    a correlated double sampling (CDS) unit configured to generate a plurality of CDS signals by performing a CDS operation on a plurality of analog pixel signals provided from the pixel array; and
    an analog-to-digital conversion unit configured to generate the pixel data by digitalizing the plurality of CDS signals.

12. The image sensor of claim 1, wherein the image sensor is a complementary metal oxide semiconductor (CMOS) image sensor.

13. An image capture device, comprising:
    a pixel array including a plurality of pixels, the pixel array being configured to convert light incident on the pixel array into pixel data, the incident light including light corresponding to an object and ambient light;
    an image data generation unit configured to generate image data corresponding to the object based on the pixel data; and
    an illuminance data generation unit configured to generate illuminance data corresponding to the ambient light based on the pixel data,
    the plurality of pixels including first pixels,
    the pixel data including first data generated based on light incident on the first pixels,
    both the image data and the illuminance data being generated based on the first data,
    wherein the pixel array includes a plurality of ambient light sensing units each of which includes at least two adjacent unit pixels among the plurality of unit pixels,
    wherein the illuminance data generation unit is configured to select effective sensing units among the plurality of ambient light sensing units by performing a crop operation and a sub-sampling operation on the pixel array, and configured to generate the illuminance data based on effective pixel data, which correspond to the effective sensing units, among the pixel data, and
    wherein the illuminance data generation unit includes,
        a spectrum response compensation unit configured to extract the effective pixel data among the pixel data, and to generate a luminance data based on the effective pixel data;
        an automatic exposure adjustment unit configured to generate an exposure control signal based on the luminance data; and
        a calculation unit configured to generate the illuminance data based on the luminance data and the exposure control signal,
    the sensing device being configured to control an exposure time of the plurality of unit pixels based on the exposure control signal.

14. The image capture device of claim 13, wherein the illuminance data generation unit is configured to generate the illuminance data based on an angle of view of the image sensor that is used for generating the image data.

15. The image capture device of claim 13, wherein
    the pixel array includes a plurality of ambient light sensing units, each of which includes at least two adjacent pixels among the plurality of pixels,
    the illuminance data generation unit is configured to select, as effective sensing units, a sub set of the plurality of ambient light sensing units by performing a crop operation and a sub-sampling operation on the pixel array, and
    the illuminance data generation unit is configured to generate the illuminance data based on effective data, the effective data being data, from among the pixel data, that corresponds to the pixels of the effective sensing units.

* * * * *